United States Patent [19]

Kuwabara et al.

[11] Patent Number: 5,499,347
[45] Date of Patent: Mar. 12, 1996

[54] SYSTEM HAVING MULTIPLE DATA FLOW PROCESSORS AND SWITCHING UNIT FOR SELECTIVELY SUPPLYING PACKETS CONTAINING DATA FROM PACKET TRANSMITTER TO ANY SELECTED DATA FLOW PROCESSOR

[75] Inventors: Tatsuyuki Kuwabara; Masaharu Tomita; Kiyotaka Nagamura; Takao Nakamura, all of Mitaka; Shin'ichi Yoshida, Osaka; Souichi Miyata, Osaka; Tsuyoshi Muramatsu, Osaka, all of Japan

[73] Assignees: Japan Radio Co., Ltd., Tokyo; Sharp Corporation, Osaka, both of Japan

[21] Appl. No.: 136,972

[22] Filed: Oct. 14, 1993

[30] Foreign Application Priority Data

Oct. 16, 1992  [JP]  Japan .................................. 4-278275

[51] Int. Cl.⁶ ....................................................... G06F 3/00
[52] U.S. Cl. .................... 395/311; 364/238.1; 364/229.1; 364/238.2; 364/260; 364/DIG. 1
[58] Field of Search ..................................... 395/800, 275, 395/311

[56] References Cited

U.S. PATENT DOCUMENTS

| 4,254,473 | 3/1981 | Galdun | 395/275 |
| 4,881,196 | 11/1989 | Terada | 395/200.01 |
| 5,226,040 | 7/1993 | Noble | 370/56 |

Primary Examiner—Eric Coleman
Attorney, Agent, or Firm—Loeb and Loeb

[57] ABSTRACT

A system having multiple data flow processors is provided which can independently test the operation of each individual data flow processor so that any failure found in the test will easily be located. A host computer is selectively connected to one of a plurality of data flow processors through a switching unit. The switching unit can select one of the data flow processors which can independently be tested.

4 Claims, 2 Drawing Sheets

SYSTEM HAVING MULTIPLE DATA FLOW PROCESSORS AND SWITCHING UNIT FOR SELECTIVELY SUPPLYING PACKETS CONTAINING DATA FROM PACKET TRANSMITTER TO ANY SELECTED DATA FLOW PROCESSOR

BACKGROUND OF THE INVENTION

1. Field of the Invention

The present invention relates to a system having multiple data flow processors and particularly to such a system capable of changing data flow processors communicating with a host computer from one to another.

2. Description of the Related Art

The data flow processor responds to packets sequentially inputted thereinto to execute a program which has been stored in the data flow processor. FIG. 2 shows the functional arrangement of the data flow processor. As shown in FIG. 3, a packet 20 comprises a data part 21 containing data to be processed by the data flow processor and a tag part 24 including an instruction 22 for instructing the data flow processor to perform the process and a destination number 23 storing a number corresponding to each address in the program to be executed.

The processing flow when the packet 20 is inputted into the data flow processor will be described below.

As seen from FIG. 2, the data flow processor 10 comprises an input/output control unit 11, a program storage unit 12 in which a program to be executed by the data flow processor 10 has been stored, a queuing unit 13 in which a packet read therein is temporarily held until another packet functioning as a companion in operation is read in the queuing unit 13, and a processing unit 14 for executing the operation.

After having been inputted into the input/output control unit 11 of the data flow processor 10, the packet 20 is fed to the program storage unit 12 wherein the instruction 22 to be executed and the destination number 23 are obtained by the data flow processor 10. If the instruction 22 included in the packet 20 is one to be executed as one of a pair of packets, the first packet 20 is held in the queuing unit 13 until the other packet 20 functioning as a companion in operation is inputted into the queuing unit 13. When the other packet 20 is fetched by tile queuing unit 13, the paired packets 20 are fed to tile processing unit 14 wherein the operation is executed. If the instruction 22 in the first packet 20 is not one to be executed as one of a pair of packets, the first packet 20 passes through the queuing unit 13 without being held and then goes to the processing unit 14 wherein the instruction 22 therein is executed. The contents of the packet 20 are updated when tile instruction 22 thereof is executed in the processing unit 14. The updated packet 20 is then fed back to the input/output control unit 11 from which it will be outputted to the other data flow processor 10 or the like connected to the data flow processor in question or fed to the program storage unit 12 in which tile operation thereto is again to be executed, depending on the updated contents of that packet 20.

If the instruction 22 included in a packet 20 is one for loading a program, an external program can be stored in the program storage unit 12 of the data flow processor 10 when packets 20 each containing part of that program are sequentially inputted into the data flow processor 10.

When the packets 20 are sequentially inputted into the data flow processor 10, thus, the latter can execute or store a specific processing program.

FIG. 4 shows a system having multiple data flow processors constructed in accordance with the prior art, which comprises a host computer 31 for transmitting packets 20, a first data flow processor 32 connected to the host computer 31 and adapted to receive packets 20 from the host computer 31 for performing the process, and a second data flow processor 33 connected to the first data flow processor 32 and adapted to receive packets 20 from the first data flow processor 32 for performing the process. The first and second data flow processors 32 and 33 may be of the same structure as that of the data flow processor 10 shown in FIG. 2.

The system having multiple data flow processors will operate as follows:

When the host computer 31 transmits data including packets 20 to tile first data flow processor 32, the communication between the host computer 31 and the first data flow processor 32 is tested. On termination of such a test, packets 20 are sequentially fed from the host computer 31 to the first data flow processor 32 to test the first data flow processor 32 in operation.

The operation of the second data flow processor 33 will then be tested through the first data flow processor 32 which has been tested in operation. First of all, the host computer 31 sequentially outputs packets 20 to the first data flow processor 32. On receipt of these packets 20, the data flow processor 32 performs a given process. The input/output control unit 11 of the first data flow processor 32 then outputs the corresponding packets 20 to the second data flow processor 33, depending on the updated contents of the packets 20. The operation of the second data flow processor 33 will be tested by the packets 20 fed thereto from the first data flow processor 32.

In such a manner, the proper operation of the prior art system having multiple data flow processors will be confirmed by testing the operation of the second data flow processor 33.

However, the system having multiple data flow processors of the prior art can test the operation of the second data flow processor 33 only through the first data flow processor 32. In other words, the operation of the second data flow processor 33 cannot be tested in isolation. Thus, the communication between only the first and second data flow processors 32, 33 cannot be tested. If any failure is found on testing the operation of tile second data flow processor 33, one cannot specify whether such a failure is in the communication between the first and second data flow processors 32, 33 or in the second data flow processor 33 itself.

If there is any failure in the first data flow processor 32, the operational test in the second data flow processor 33 can be made only after the failure has been removed from the first data flow processor 32. Therefore, the system having multiple data flow processors of tile prior art requires a lot of time to test the entire operation thereof.

SUMMARY OF THE INVENTION

It is therefore an object of the present invention to provide a system having multiple data flow processors which can independently test each individual data flow processor so that a failure can easily be located.

To this end, the present invention provides a system having multiple data flow processors comprising a plurality of data flow processors connected in series with one another, packet transmitting means for transmitting packets required to execute a data flow processing, and switching means for receiving said packets and for selecting one of said plurality of data flow processors to which said received packets are to be provided.

In such an arrangement, the system having multiple data flow processors of the present invention can select a data flow processor communicable with the packet transmitting means by the switching means.

If a data flow processor is connected to the packet transmitting means through the switching means, there can independently be tested the communication between that data flow processor and the packet transmitting means and the operation of that data flow processor. The packet transmitting means is then switched to another different data flow processor selected by the switching means. Similarly, the communication and operation thereof can be tested. In such a manner, each individual data flow processor can independently be tested in operation. Thereafter, a data flow processor connected to the packet transmitting means via the switching means and the data flow processor which has properly been tested in operation will be tested in operation through the other data flow processor.

Thus, any failure can easily be specified by performing various tests including the communication test between the data flow processors after each individual data flow processor has been tested in operation.

BRIEF DESCRIPTION OF THE DRAWINGS

The present invention will be described in detail with reference to a preferred embodiment thereof illustrated in the accompanying drawings wherein parts similar to those of the prior art system having multiple data flow processors are designated by similar reference numerals.

DETAILED DESCRIPTION OF THE PREFERRED EMBODIMENTS

Figure 1:
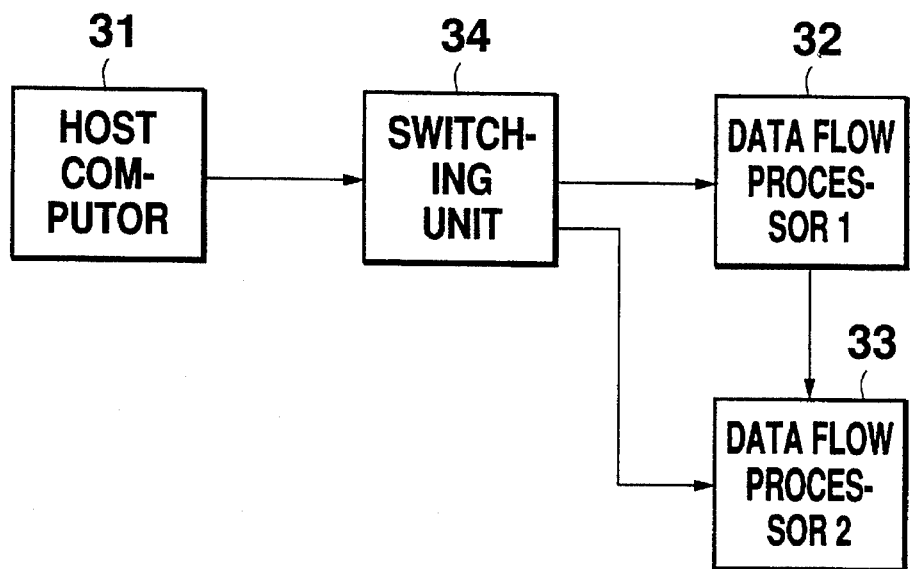
FIG. 1 is a schematic diagram of one preferred embodiment of a system having multiple data flow processors constructed in accordance with the present invention.

Referring first to FIG. 1, there is shown a system having multiple data flow processors constructed in accordance with the present invention. As shown In FIG. 1, the system having multiple data flow processors is characterized by that a switching unit 34 is provided between a host computer 31 and two data flow processors 32 and 33. Thus, each individual data flow processor 32 or 33 can be independently tested with respect to the communication between that data flow processor and the host computer 31 and the operation of that data flow processor.

Figure 2:
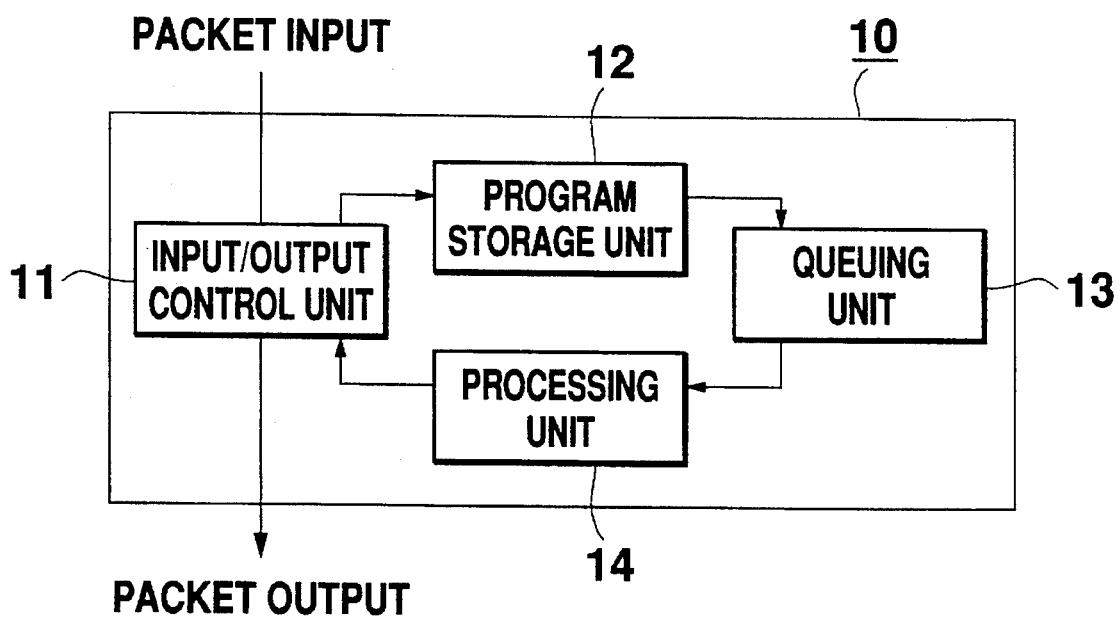
FIG. 2 is a schematic diagram of one data flow processor usable in the system having multiple data flow processors of FIG. 1.
Figure 3:
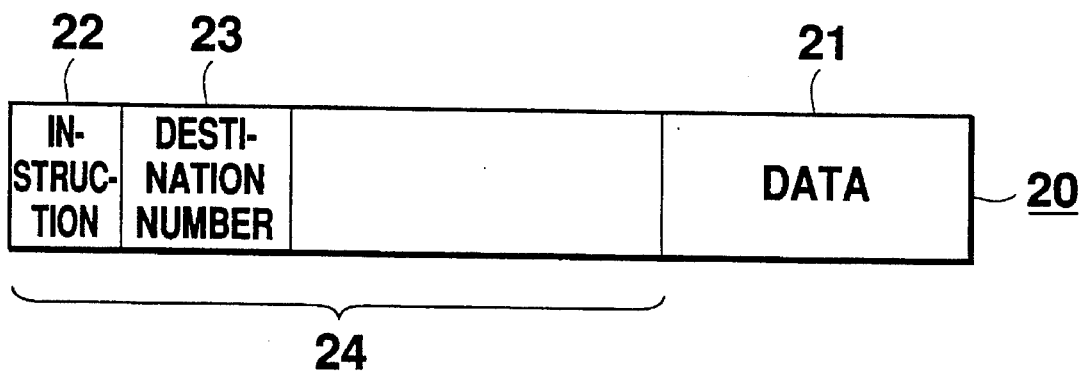
FIG. 3 is a format of a packet.
Figure 4:
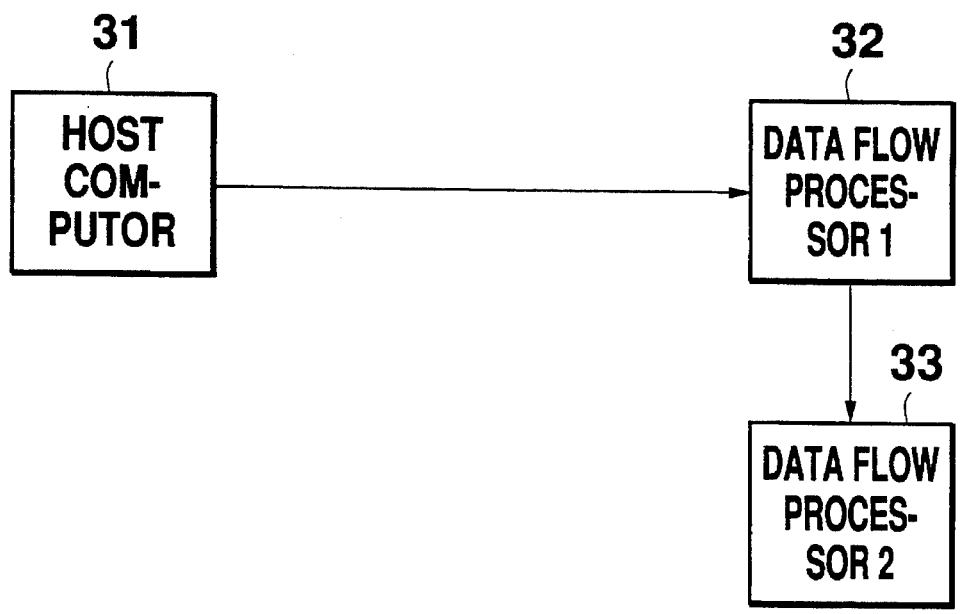
FIG. 4 is a schematic diagram of a system having multiple data flow processors constructed in accordance with the prior art.

As seen from FIG. 1, the system having multiple data flow processors comprises a host computer 31 for transmitting such packets 20 as shown in FIG. 3, two data flow processors 32 and 33 each responsive to packets 20 from the host computer 31 to perform a processing, and a switching unit 34 connected between the host computer 31 and the data flow processors 32, 33 and adapted to select one of the two data flow processors 32 and 33 to which the packets 20 from the host computer 31 are to be supplied. The two data flow processors 32 and 33 are connected to each other. The data flow processors 32 and 33 may be of the same structure as that of the data flow processor 10 shown in FIG. 2.

The entire operation of the system having multiple data flow processors will be confirmed as follows:

In order to test the operation of one data flow processor 32, the output of the host computer 31 is first connected to the data flow processor 32 through tile switching unit 34. The switching unit 34 receives packets 20 from the host computer 31 and only feeds them to the selected data flow processor. In this case, thus, tile switching unit 34 only provides the packets 20 transmitted from the host computer 31 to the data flow processor 32. After such a setting, the communication between the host computer 31 and the data flow processor 32 is tested by outputting packets 20 from the host computer 31 to the data flow processor 32. On termination of the communication test, packets 20 are then sequentially fed from the host computer 31 to the data flow processor 32 to test the data flow processor 32 in operation.

When the operational test in the data flow processor 32 has been terminated, the output of the host computer 31 is connected to the other data flow processor 33 by selection of the switching unit 34. The same tests of communication and operation as in the data flow processor 32 will be performed in the data flow processor 33.

After the data flow processors 32 and 33 have been tested in operation as described, the output of the host computer 31 is again connected to the data flow processor 32 by selection of the switching unit 34. The host computer 31 sequentially outputs packets 20 to the selected data flow processor 32. The data flow processor 32 receives the packets 20 and executes a given process. The input/output control unit 11 in the data flow processor 32 will output the necessary packets 20 to the other data flow processor 33, depending on the updated contents of the packets 20. Thus, the data flow processor 33 will be tested in operation by the packets 20 transmitted thereto from the data flow processor 32.

In such a manner, the entire operation of the system having multiple data flow processors can be confirmed.

If there is any failure when the data flow processor 33 is tested in operation by the packets transmitted through the data flow processor 32, it can easily be judged that such a failure is in the communication between the data flow processors 32 and 33, since the data flow processor 33 has already been tested in operation independently.

Although the invention has been described as to two data flow processors 32 and 33, it may be applied to a system having multiple data flow processors having any number of data flow processors which are connected to the host computer through the switching unit 34.

The independent test of each individual data flow processor 32 or 33 may be performed in any order for convenience. Further, the host computer 31 may be replaced by any other data flow processing means such as a data flow processor.

As will be apparent from the foregoing, the present invention can connect any desired data flow processor to the packet transmitting means through the switching unit independently of the other data flow processor(s). Therefore, each individual data flow processor can independently be tested In operation.

Since each individual data flow processor can be tested in operation through the other data flow processor after it has been tested individually in operation, it can easily be judged whether any failure found in this test is in the communication between the data flow processors or in that data flow processor itself.

Furthermore, even if a failure created in a data flow processor located upstream of the data flow is being repaired, the downstream data flow processor can independently be tested in operation. Thus, the entire operation of the system having multiple data flow processors can be confirmed in less time.

We claim:

1. A system having multiple data flow processors comprising a plurality of data flow processors connected in series with one another, packet transmitting means for transmitting packets required to execute a desired data flow processing and switching means for receiving said packets and for selecting one of said plurality of data flow processors to which said received packets are to be supplied, said switching means having a plurality of outputs each connected to a respective one of said data flow processors for supplying packets received by said switching means to the respective one of said data flow processors, said switching means being operable for selectively supplying packets from said packet transmitting means to only one of said outputs.

2. A system having multiple data flow processors as defined in claim 1 wherein each of said data flow processors comprises an input/output control unit, a program storage unit in which a program to be executed by the data flow processor has been stored, a queuing unit in which a packet first read therein is temporarily held until another packet functioning as a companion in operation is read in said queuing unit where an instruction is to be executed by a plurality of packets, and a processing unit for performing a given processing operation.

3. A system having multiple data flow processors as defined in claim 1 wherein said packet transmitting means is a host computer.

4. A system having multiple data flow processors as defined in claim 1 wherein said packet transmitting means is a data flow processor.

* * * * *